United States Patent
Umewaka et al.

(10) Patent No.: US 7,171,178 B2
(45) Date of Patent: *Jan. 30, 2007

(54) TUNING CIRCUIT HAVING AMPLITUDE-VARYING FUNCTION

(75) Inventors: Masahiro Umewaka, Gunma (JP); Hiroya Yamamoto, Gunma (JP); Keitaro Sekine, Tokyo (JP); Akira Hyogo, Chiba (JP); Keiji Morijiri, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 328 days.

This patent is subject to a terminal disclaimer.

(21) Appl. No.: 10/763,441

(22) Filed: Jan. 23, 2004

(65) Prior Publication Data

US 2004/0198285 A1    Oct. 7, 2004

(30) Foreign Application Priority Data

Jan. 24, 2003  (JP) ............................. 2003-016147

(51) Int. Cl.
*H04B 1/16* (2006.01)

(52) U.S. Cl. .............................. 455/195.1; 455/150.1; 455/200.1; 455/193.2

(58) Field of Classification Search ............. 455/195.1, 455/150.1, 200.1, 193.2, 197.1, 177.1, 169.1, 455/170.1, 178.1, 184.1, 198.1, 334, 193.1, 455/197.2, 192.1, 164.1, 232.1–253.2; 375/345
See application file for complete search history.

(56) References Cited

U.S. PATENT DOCUMENTS

| 3,496,473 | A | * | 2/1970 | Fruehsamer et al. | 455/192.3 |
| 3,510,580 | A | * | 5/1970 | Okuno | 455/234.1 |
| 4,144,512 | A | * | 3/1979 | Umemura et al. | 455/195.1 |
| 5,699,055 | A | * | 12/1997 | Dykema et al. | 455/150.1 |
| 6,184,751 | B1 | * | 2/2001 | Siomkos et al. | 455/241.1 |
| 6,356,197 | B1 | * | 3/2002 | Patterson et al. | 455/195.1 |
| 6,922,550 | B1 | * | 7/2005 | van Rumpt | 455/195.1 |
| 2005/0147193 | A1 | * | 7/2005 | Umewaka et al. | 375/345 |

FOREIGN PATENT DOCUMENTS

JP    10-23084    1/1998

OTHER PUBLICATIONS

Keiji Morijiri et al., "A Wireless Communication System Suitable for Excessive Received Signal.", Jan. 24, 2003 (Japanese).

Keiji Morijiri et al., "A Wireless Communication System Suitable for Excessive Received Signal by Using New Damping Circuits.", Jan. 24, 2003 (English).

Won-Seok Oh et al., "A CMOS Transponder IC USing a New Damping Circuit", Jun. 2002 (English).

* cited by examiner

*Primary Examiner*—Lana Le
(74) *Attorney, Agent, or Firm*—SoCal IP Law Group LLP; Steven C. Sereboff

(57) ABSTRACT

A tuning circuit having an amplitude-varying function is disclosed that comprises a coil, a capacitor, and a resistance-adjusting element connected in parallel to the coil and the capacitor for varying resistance at time of resonance of the tuning circuit, wherein the amplitude of an output signal of the tuning circuit is varied by varying the resistance with the resistance-adjusting element.

6 Claims, 9 Drawing Sheets

TUNING CIRCUIT

TUNING CIRCUIT

TUNING CIRCUIT

TUNING CIRCUIT

TUNING CIRCUIT HAVING AMPLITUDE-VARYING FUNCTION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

The present application claims priority upon Japanese Patent Application No. 2003-16147 filed on Jan. 24, 2003, which is herein incorporated by reference.

BACKGROUND OF THE INVENTION

1. Field of the Invention

The present invention relates to a tuning circuit having an amplitude-varying function and to an integrated circuit for a wireless communication device.

2. Description of Related Art

A common example of a tuning circuit and an AGC (Automatic Gain Control) in, for example, ASK (Amplitude Shift Keying) communication is shown in FIG. 9. The tuning circuit is configured by a LC parallel resonance circuit where an end of a coil (inductance) L1 and a capacitor (capacity) C1 are connected to a reference voltage Vref. The AGC circuit is configured by a variable gain amplifier, a rectifying circuit (REC) and a comparator (COMP). The variable gain amplifier adjusts and outputs the amplitude of an AC signal from the tuning circuit to an output terminal OUT. A gain amplifier, a detecting circuit and a waveform shaping circuit are connected to the output terminal OUT, and the amplitude-adjusted AC signal is processed (e.g., see Japanese Patent Application Laid-Open Publication No. Hei10-23084).

The gain factor of the AC (alternating current) signal in the variable gain amplifier is determined by the rectifying circuit and the comparator. That is, the amplitude of the AC signal is smoothed by the rectifying circuit to obtain a DC signal. Thereafter, the DC signal is compared with a reference voltage VAGC by the comparator. As a result of this comparison, the comparator feeds back output for lowering the gain factor to the gain amplifier in a case where, for example, the amplitude of the AC signal is excessive.

The tuning circuit and the AGC circuit are used, for example, in receiving devices of remote control systems. Remote control systems have various applications, such as opening/closing and locking the doors of vehicles and houses, and also starting and stopping engines in vehicles.

In realizing AGC functions such as, for example, conducting automatic control to lower the amplitude of an AGC signal in a case where the amplitude of the AGC signal is large, power consumption is great when an analog control system including the variable gain amplifier and the rectifying circuit is used. When a circuit that consumes a large amount of power is used in a battery-driven receiving device of a remote control system, battery drain is accelerated.

SUMMARY OF THE INVENTION

One aspect of the present invention is a tuning circuit having an amplitude-varying function comprising a coil, a capacitor, and a resistance-adjusting element connected in parallel to said coil and said capacitor for varying resistance at time of resonance of said tuning circuit, wherein an amplitude of an output signal of said tuning circuit is varied by varying said resistance with said resistance-adjusting element.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Outline of Disclosure

Figure 1:
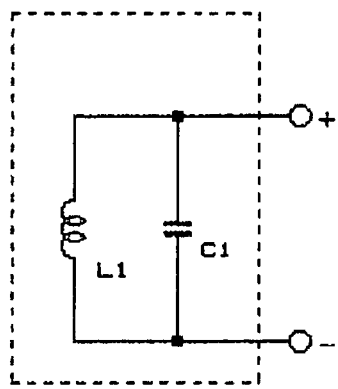
FIG. 1 is a diagram for contrasting, with a conventional tuning circuit, the principle of a tuning circuit having an amplitude-varying function according to an embodiment of the invention.
Figure 1:
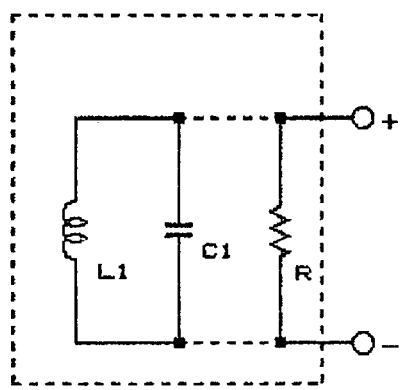
Figure 1:
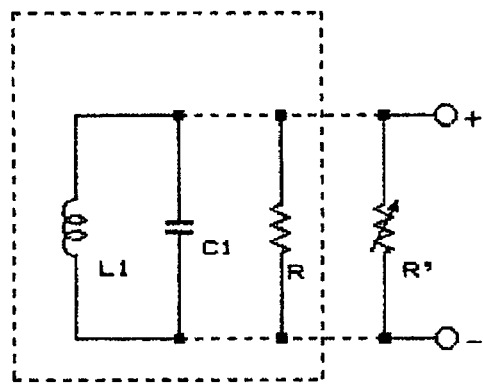

At least the following matters will be made clear by the explanation in the present specification and the description of the accompanying drawings.

A tuning circuit having an amplitude-varying function according to the present invention comprises a coil, a capacitor, and a resistance-adjusting element connected in parallel to the coil and the capacitor, for varying resistance at the time of resonance of the tuning circuit, wherein the amplitude of an output signal of the tuning circuit is varied by varying the resistance with the resistance-adjusting element.

Thus, the amplitude of the output signal of the tuning circuit can be varied by varying the resistance of the tuning circuit with the resistance-adjusting element. Therefore, minute detection of the output signal is enabled by raising the sensitivity of the tuning circuit and, even if the amplitude of the output and input becomes excessive, the amplitude thereof can be suppressed. That is, the invention can accommodate a wide dynamic range.

The resistance-adjusting element can be comprised of a transistor and vary a voltage applied to a control electrode of the transistor in order to vary the resistance.

Thus, in varying the amplitude of the output signal of the tuning circuit, the resistance of the tuning circuit can be varied with an appropriate resistance of the transistor corresponding to the applied voltage.

The resistance-adjusting element may be comprised of a transistor and switch ON and OFF the transistor in order to vary the resistance.

Thus, digital control becomes possible because the transistor that varies the resistance of the tuning circuit is switched ON and OFF. Thus, power consumption of the control system thereof can be reduced in comparison to a case where an analog control system is used. Especially in a case where the circuit of the invention is used in a battery-driven product, power consumption of a battery whose capacity is limited can be reduced.

The tuning circuit having an amplitude-varying function of the present invention may further comprise an automatic adjustment circuit system, the automatic adjustment circuit system including a comparator that varies the output when the amplitude of the output signal of the tuning circuit exceeds an automatic adjustment-use reference amplitude level, and a transistor drive-use digital circuit that outputs, in response to the variance in the output of the comparator, a digital drive signal for varying the voltage applied to the control electrode of the transistor.

Thus, the invention is disposed with the voltage-drivable automatic adjustment circuit system to realize the amplitude-varying function of the tuning circuit. As a result, power consumption can be significantly reduced in comparison to a case where a conventional analog control system is used. Power consumption of a battery whose capacity is limited can be reduced particularly in a case where the circuit of the invention is used in a battery-driven product.

A predetermined reference voltage may be applied to one end of the coil and of the capacitor making up the tuning circuit, and the alternating current signal resonated by the tuning circuit may be outputted from the other ends of the coil and of the capacitor.

One ends of the coil and of the capacitor making up the tuning circuit may be grounded, and the alternating current signal resonated by the tuning circuit may be outputted from the other ends of the coil and of the capacitor.

An integrated circuit for a wireless communication device according to the present invention comprises the resistance-adjusting element and the automatic adjustment circuit system of the above-described tuning circuit having an amplitude-varying function.

Principle

FIG. 1 is a diagram showing the principle of a tuning circuit having an amplitude-varying function according to an embodiment of the invention. The tuning circuit is used, for example, in an antenna in a sending/receiving device of a communication system. As shown in the circuit diagrams of FIG. 1, a resistance-adjusting element R' is connected in parallel to a coil L1 and a capacitor C1 (top circuit diagram of FIG. 1) in an LC parallel resonance circuit configuring the tuning circuit. The resistance-adjusting element R' has a resistance (for convenience, this resistance will be referred to as R') by itself and varies a value (resistance) R0 of the resistance component at the time of resonance of the tuning circuit. A tuning circuit to which the resistance-adjusting element R' is not connected originally has a value of a resistance component R at the time of resonance (middle circuit diagram of FIG. 1). In addition, the resistance R0 of the tuning circuit to which the resistance-adjusting element R' is connected is represented by the inverse of (1/R+1/R').

By varying the resistance R0 of the tuning circuit in this manner, a Q value of the tuning circuit is varied on the basis of the equation $Q=R0/(\omega L1)$ (where $\omega$ is angular speed and L1 is the value of inductance of the coil L1). Due to the variance in the Q value, the level of the amplitude of the output signal of the tuning circuit can be varied. It should be noted that the Q value is selectivity representing the characteristics of the tuning circuit.

Because the resistance R' of the resistance-adjusting element R' has a positive value, the resistance R0 of the tuning circuit to which the resistance-adjusting element R' is connected becomes smaller in comparison to the resistance R in the case where the resistance-adjusting element R' is not connected. As a result of the Q value becoming smaller in accompaniment with the resistance R0 of the tuning circuit becoming smaller, control that suppresses an excessive amplitude of an AC signal can be conducted.

EXAMPLE

Figure 2:
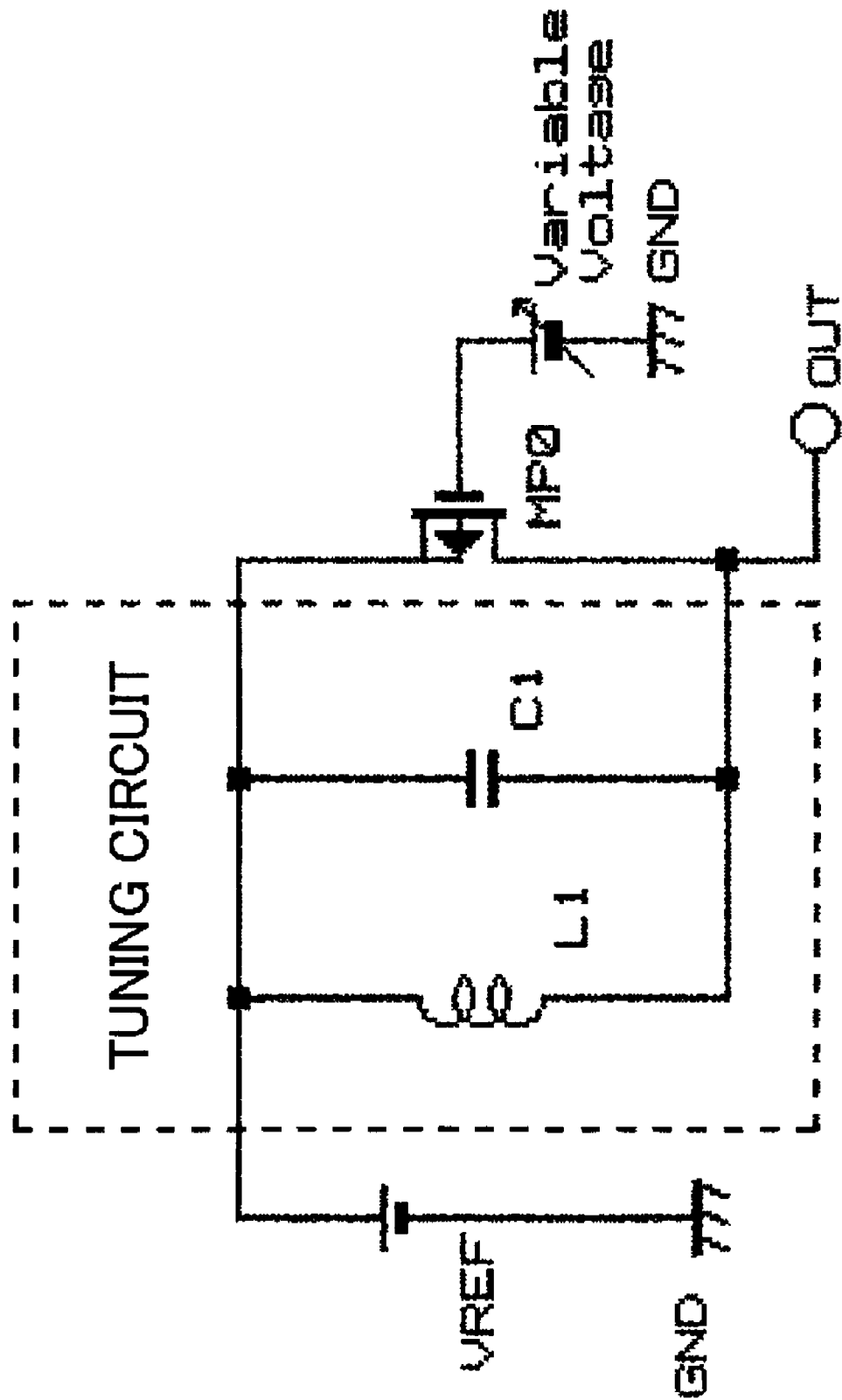
FIG. 2 is a circuit diagram of the tuning circuit having an amplitude-varying function according to the embodiment of the invention.

An example of the circuit of FIG. 1 is shown in the circuit diagram of FIG. 2. The resistance-adjusting element R' of FIG. 1 is configured by a transistor MP0. In this example, the transistor MP0 is configured by a p-channel MOSFET. A reference voltage Vref (e.g., 3 V) is applied to one end (left side in the drawing) of a coil L1 and a capacitor C1 configuring the LC parallel resonance circuit that is the tuning circuit. An AC signal resonated by the LC parallel resonance circuit is outputted from an output terminal OUT (other end) of the coil L1 and of the capacitor C1.

By varying the voltage applied to the gate (control electrode) of the transistor MP0, the resistance R0 of the tuning circuit is varied. In varying the voltage applied to the gate of the transistor MP0, there are the two arrangements of a digital drive arrangement that uses the transistor MP0 as a switching element and an analog drive arrangement that drives the transistor in an intermediate state between ON and OFF. For example, in a discrete analog drive arrangement, the voltage applied to the transistor MP0 is set to a value in the range (e.g., 1V, 2V, 3V, etc.) of 0V (ON voltage) to 5V (OFF voltage). In so doing, plural discrete resistances are obtained between the drain and the source of the transistor MP0. Precise control of the amplitude levels of AC signals corresponding to these plural discrete resistances can be conducted.

Next, description will be given of the digital drive arrangement that drives the transistor MP0 ON and OFF as a switching element. That is, the voltage applied to the gate of the transistor MP0 is set to 0V (ON voltage) or 5V (OFF voltage). For example, due to the transistor MP0 being switched ON, the resistance of the tuning circuit varies and the amplitude level of the AC signal from the output terminal OUT can be adjusted.

Next, an example will be described, with reference to FIG. 3, where a tuning circuit having an AGC function is realized by adding an AGC circuit system (automatic adjustment circuit system) to the tuning circuit shown in FIG. 2. The AGC circuit system connected to the tuning circuit includes a level shift circuit ("Level Shift Circuit" in the drawing), a hysteresis comparator ("Hysteresis Comparator" in the drawing) and a transistor drive-use digital circuit.

Figure 9:
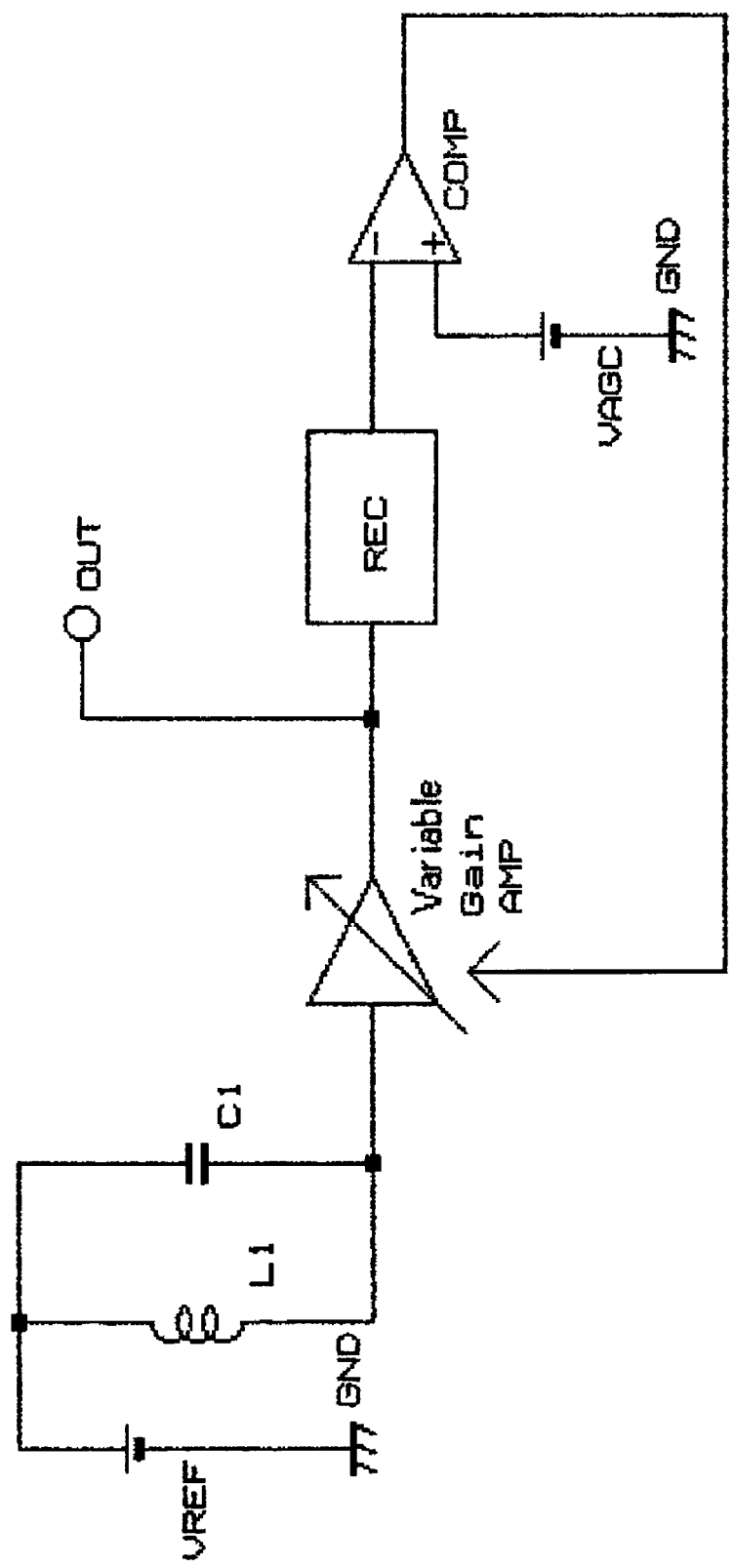
FIG. 9 is a circuit diagram showing a conventional tuning circuit having an amplitude-varying function.

In the present invention, due to the principle of amplitude variance described with reference to FIG. 1, it is not necessary to use an analog circuit system of an adjusting circuit and variable gain amplifier such as in the conventional circuit shown in FIG. 9. For this reason, power consumption can be significantly reduced.

First, description will be given in regard to the function of the AGC circuit system. The hysteresis comparator varies the output when the amplitude of the AC signal (output signal) from the tuning circuit becomes equal to or greater than a reference amplitude level for automatic adjustment. In accordance with the variance in the output of the hysteresis comparator, the transistor drive-use digital circuit outputs a digital drive signal VAGC for varying the voltage applied to the gate of the transistor MP0.

In inputting the AC signal from the tuning circuit to the hysteresis comparator, the level shift circuit has the function of shifting the direct current level of the AC signal and making both the direct current levels consistent. That is, in the present example, a reference voltage Vref of 3V is applied to the tuning circuit. For this reason, when the transistor MP0 is switched ON and the resistance varies, an AC signal superposed on a direct current voltage of about 3V is outputted from the tuning circuit. The level shift circuit shifts the direct current component of about 3V from the tuning circuit to a direct current level sufficient for the hysteresis comparator to operate. Moreover, a central voltage of an automatic adjustment-use reference amplitude level serving as a comparative reference in the hysteresis comparator is also generated.

Next, description will be given of a specific circuit configuration of the level shift circuit, the hysteresis comparator and the transistor drive-use digital circuit. First, the level shift circuit is configured by a level shift circuit including a current mirror circuit. As shown in FIG. 3, the level shift circuit is configured by a level shifter section having an essential level shift function and a current mirror circuit section.

The level shifter section is configured by a transistor (n-channel MOSFET) MN1, a transistor (n-channel MOSFET) MN2, a transistor (n-channel MOSFET) MN3 and a transistor (n-channel MOSFET) MN4. The AC signal from the tuning circuit is inputted to the gate of the transistor MN2. The drain and the source of the transistor MN4 are connected so that the transistor MN4 functions as a diode (resistance component).

The current mirror circuit section is configured by a constant current source that supplies a constant current I1 and a transistor (n-channel MOSFET) MN5. The constant current I1 that the constant current source supplies serves as the source of the reference voltage (automatic adjustment-use reference amplitude level) applied to an inverted input terminal of the hysteresis comparator. The drain and the gate of the transistor MN5 are interconnected and also connected to the gate of the transistor MN3. The gate of the transistor MN3 is also connected to the gate of the transistor MN1 of the level shifter section, and the drain of the transistor MN3 is connected to the source of the transistor MN4. Also, both the transistor MN2 and the transistor MN4 are consistent and the direct current voltages of the sources of both are set to become equal. In the example circuit of FIG. 3, a direct current level that is lower than 3V by the gate-to-source voltage VGS of the transistor MN2 and the transistor MN4 is generated in the sources of the transistor MN2 and the transistor MN4.

In the level shift circuit of this configuration, the source of the transistor MN2 is connected to a non-inverted input terminal (+) of the hysteresis comparator, and the source of the transistor MN4 is connected to an inverted input terminal (−) of the hysteresis comparator. Thus, a mutually equal 3V-VGS direct current voltage is applied to both the non-inverted input terminal and the inverted input terminal of the hysteresis comparator. That is, only a direct current is applied to the inverted input terminal of the hysteresis comparator, and the hysteresis comparator has a reference voltage (automatic adjustment-use reference amplitude level) at a high side and a low side of this direct current level. A signal whose direct current level has been level-shifted to 3V-VGS in regard to the AC signal from the tuning circuit is inputted to the non-inverted input terminal of the hysteresis comparator. That is, the hysteresis comparator compares the amplitude of the AC signal with the reference voltage and varies the output from "L" to "H" when the amplitude of the AC signal exceeds the reference voltage. The output of the hysteresis comparator is outputted to the transistor drive-use digital circuit.

The transistor drive-use digital circuit outputs, in accordance with the variance in the output of the hysteresis comparator, a digital drive signal for varying the voltage applied to the gate of the transistor MN0. The transistor drive-use digital circuit is a voltage-driven circuit and includes a reset D flip-flop circuit FD2, an RSFF (set reset flip-flop) circuit configured by two NOR circuits NR1 and NR2, and a NAND circuit ND1.

The output of the hysteresis comparator is applied to a clock terminal C of the D flip-flop circuit FD2. With respect to the D flip-flop circuit FD2, a power supply VCC is connected to a data terminal D and an input terminal (reset terminal) of the NOR circuit NR1 is connected to an output terminal Q. Moreover, a reset terminal RESET is connected to a reset terminal RN of the D flip-flop circuit. The reset terminal RESET is also inversely connected to an input terminal of the NAND circuit ND1. With respect to the NAND circuit ND1, the power supply VCC is connected to the other input terminal, and the output terminal is connected to an input terminal (set terminal) of the NOR circuit NR2 of the RSFF circuit. Also, other alternatives exhibiting an inverter function are applicable for the NAND circuit ND1. It should be noted that, as is well known, the RSFF circuit has a basic configuration using the two NOR circuits NR1 and NR2. The digital drive signal VAGC is outputted from the output terminal of the NOR circuit NR1. Also, the RSFF circuit may be a reset D flip-flop circuit.

The AGC operation will be described, with reference to the waveform chart shown in FIG. 4, with focus on the transistor drive-use digital circuit of this configuration. First, the point in time to a time T0 in FIG. 4—that is, the state of each signal in a state (reset state) where the level-shifted AC signal from the tuning circuit has not been inputted to the hysteresis comparator—will be described. The output of the hysteresis comparator (waveform "C" in FIGS. 3 and 4), the output of the D flip-flop circuit FD2 (waveform "Q" in FIGS. 3 and 4) and the output of the NAND circuit ND1 ("waveform of the NAND circuit ND1" in FIGS. 3 and 4) are in "L" states. The output of the NOR circuit NR1 (digital drive signal VAGC; waveform "VAGC" in FIGS. 3 and 4)

and the voltage applied to the reset terminal RESET (waveform "RESET" in FIGS. 3 and 4) are in "H" states.

A case will be described where from the point in time following the time T0 in FIG. 4, the AC signal is level-shifted and inputted from the tuning circuit to the hysteresis comparator, and the amplitude of this AC signal is excessive. After the AC signal having the excessive amplitude is inputted to the hysteresis comparator, the input level to the non-inverted input terminal becomes larger than the reference voltage to the inverted input terminal within the first several ms (time T0 to T1), whereby the hysteresis comparator varies the output C from "L" to "H". When this happens, the output Q of the D flip-flop circuit FD2 is switched to the "H" state, the RSFF circuit is reset and the digital drive signal VAGC is also inverted to the "L" state. As a result, the transistor MP0 is switched ON and, as described previously, the AGC with respect to the tuning circuit operates so that the amplitude of the AC signal is suppressed.

It should be noted that the voltage applied to the reset terminal RESET is maintained in the "H" state. Thus, the "L" state of the digital drive signal VAGC is maintained in the "L" state and the ON state of the transistor MP0, which is the resistance-adjusting element, can be maintained (held) so that the AGC operation can be prevented from stopping.

Thereafter, in a case where the AGC operation is stopped and the signal state of each section is initialized, an "L" reset-use pulse signal is applied to the reset terminal RESET (time T2). When this happens, the output Q of the D flip-flop circuit FD2 returns to the "L" state. At the same time, the output of the NAND circuit ND1 outputs an "H" pulse signal to match the reset-use pulse signal. The RSFF circuit is set to match the rise of this pulse signal and the digital drive signal VAGC is also inverted and switched to the "H" state. As a result, the transistor MP0 is switched OFF and, as described previously, the AGC operation with respect to the tuning circuit stops.

Figure 3:
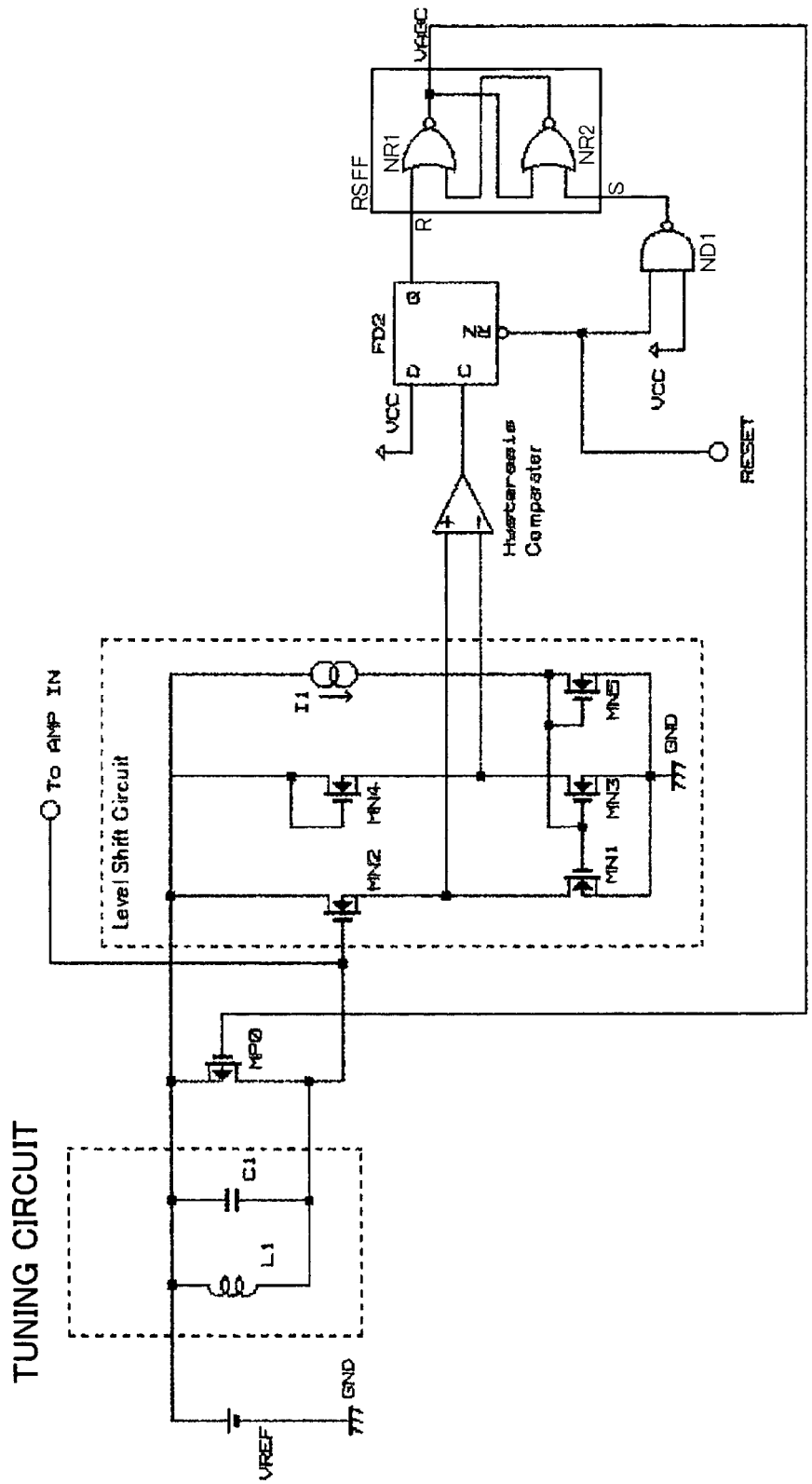
FIG. 3 is a circuit diagram of a tuning circuit having an AGC function according to the embodiment of the invention.
Figure 4:
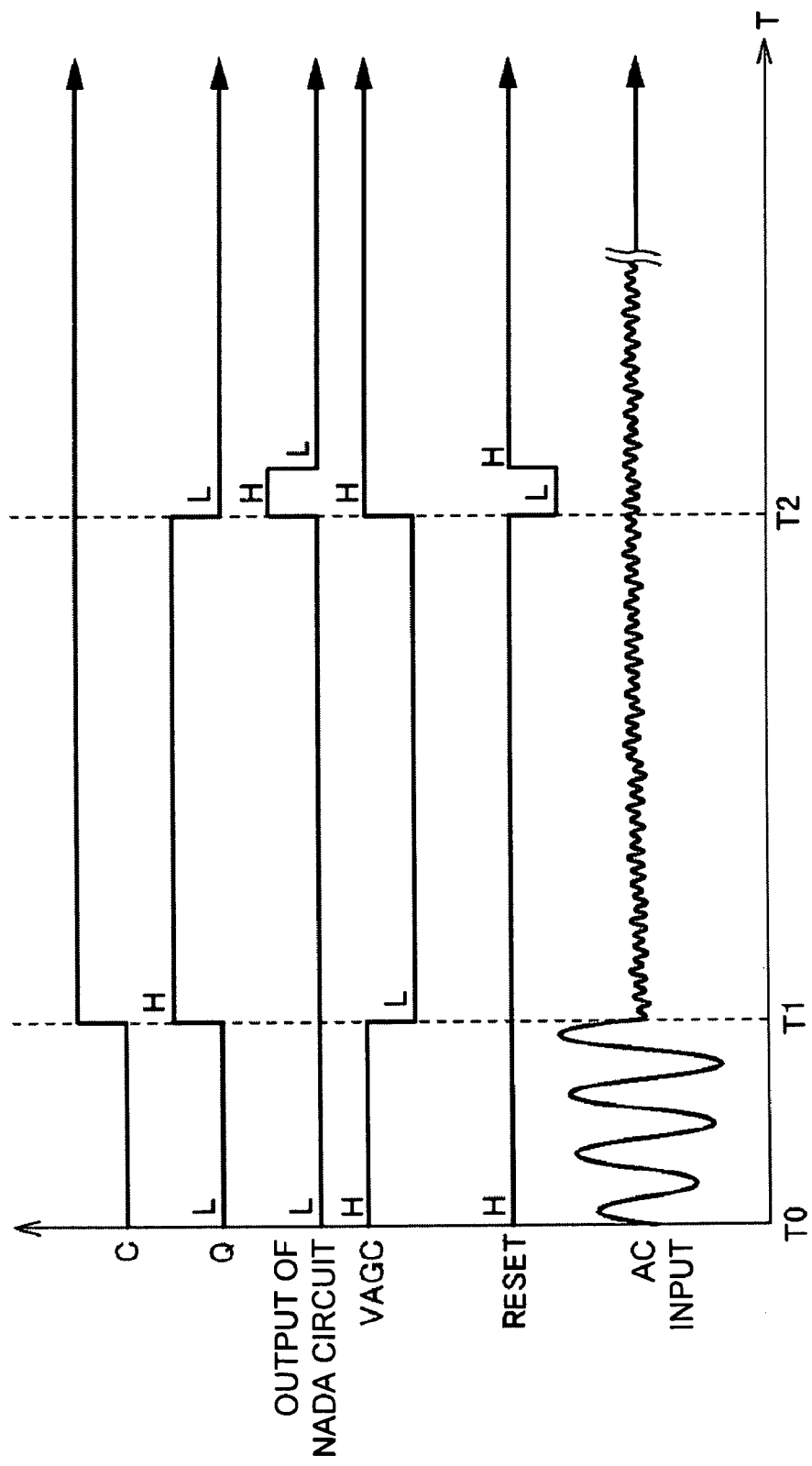
FIG. 4 is a waveform chart showing the state of signals of respective sections of a transistor drive-use digital circuit shown in FIG. 3.

Also, the reset D flip-flop circuit is applicable with respect to the RSFF circuit of FIG. 3 and the same operation can be obtained using the output thereof as the VAGC.

ANOTHER MODIFIED EXAMPLE

Figure 5:
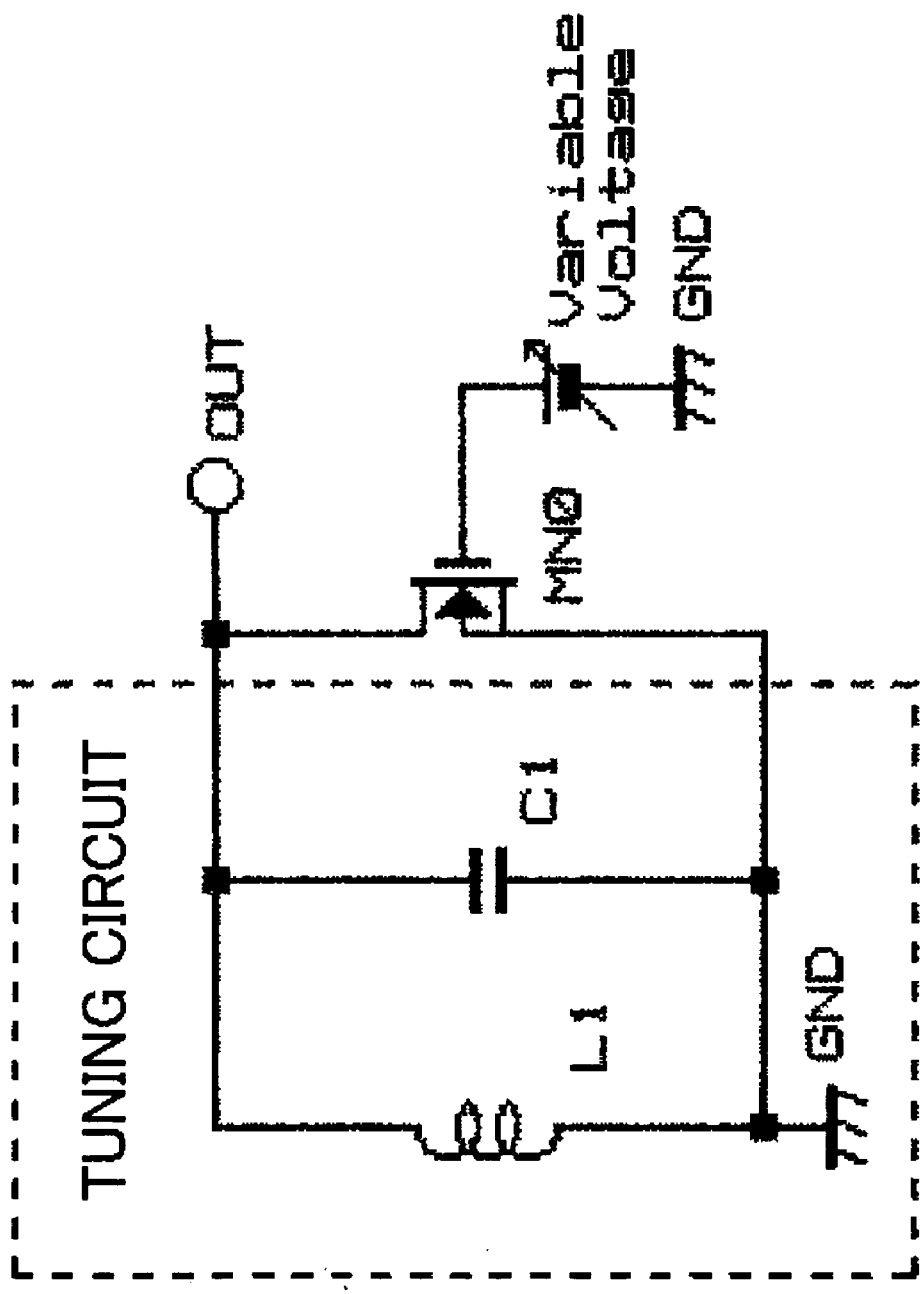
FIG. 5 is a diagram showing the principle of a modified example according to the embodiment of the invention.
Figure 6:
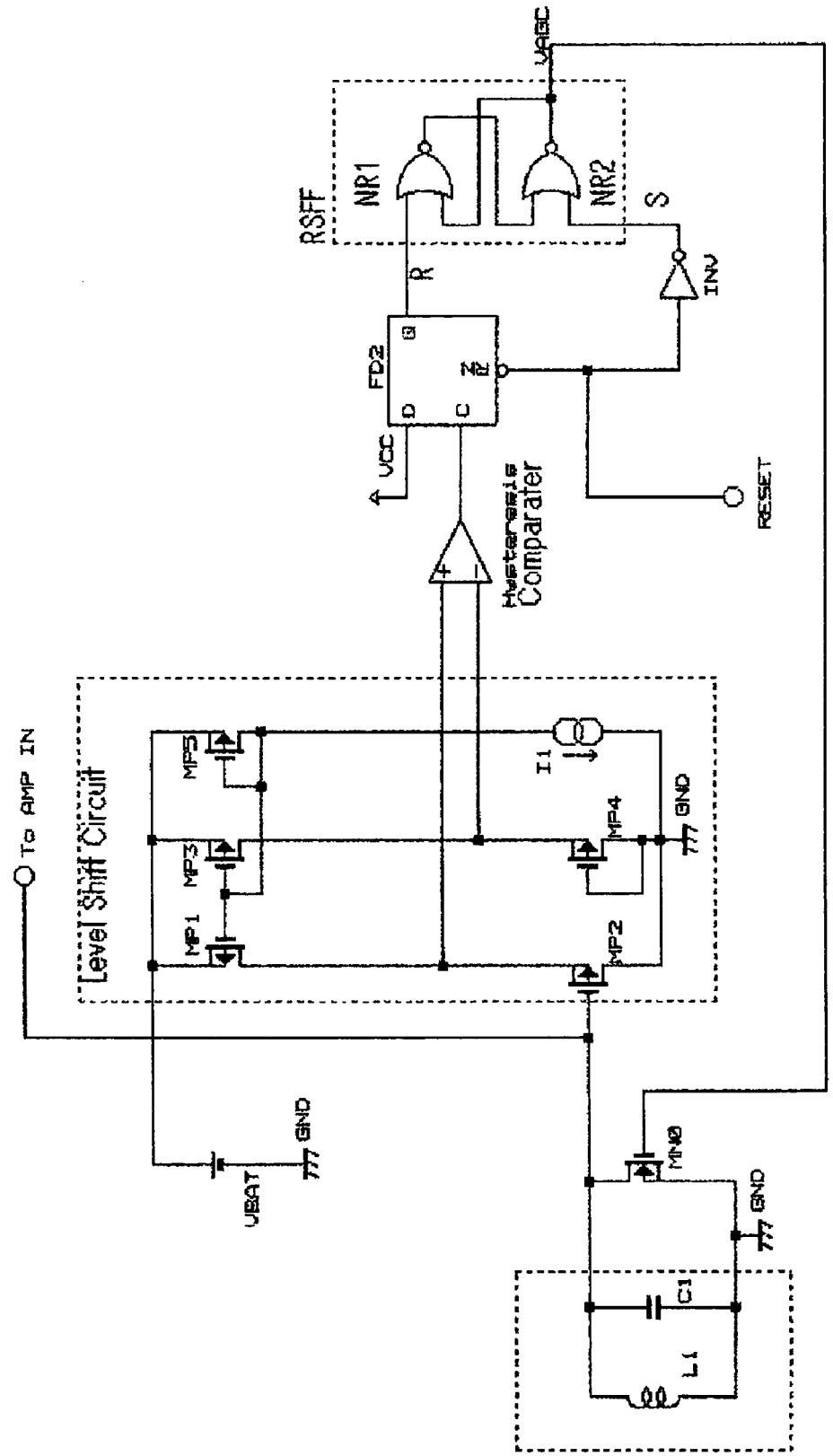
FIG. 6 is a circuit diagram showing a modified example of the tuning circuit having an amplitude-varying function according to the embodiment of the invention.

A modified example of the embodiment that was described with reference to FIGS. 1 to 4 is shown in FIGS. 5 and 6 and will be described. That is, as shown in FIG. 5, the resistance-adjusting element R' is configured by the transistor MN0 comprising an n-channel MOSFET. An end (left side in the drawing) of the coil L1 and the capacitor C1 configuring the LC parallel resonance circuit that is the tuning circuit is grounded (GND connection). The AC signal resonated by the LC parallel resonance circuit is outputted from the output terminal (other end) of the coil L1 and the capacitor C1.

Due to a modification wherein the n-channel MOSFET transistor MN0 is employed as the resistance-adjusting element R' and the ends of the coil L1 and the capacitor C1 are grounded, the level shifter section of the level shift circuit is configured by a transistor (p-channel MOSFET) MP1, a transistor (p-channel MOSFET) MP2, a transistor (p-channel MOSFET) MP3 and a transistor (p-channel MOSFET) MP4, as shown in FIG. 6. The current mirror circuit section is configured by a constant current source supplying a constant current I1 and a transistor (p-channel MOSFET) MP5. The drain and the gate of the transistor MP5 are interconnected and also connected to the gates of the transistors MP1 and MP3. Thus, both the MP2 and the MP4 are consistent, whereby the direct current voltages of both are set to become equal. In the example circuit of FIG. 6, a direct current level that is higher than the GND by the gate-to-source voltage VGS of the MP2 and MP4 is generated in the sources of the MP2 and MP4.

Also, the connection arrangement of the RSFF circuit outputting the digital drive signal VAGC is changed in comparison to the case of FIG. 3. The RSFF circuit has a well known basic configuration and connection state. That is, in FIG. 6, an input terminal of the NOR circuit NR1 of the RSFF circuit is connected to the output terminal of the NAND circuit ND1, and an input terminal of the NOR circuit NR2 of the RSFF circuit is connected to the Q terminal of the D flip-flop circuit FD2. In other words, when the output Q of the D flip-flop circuit FD2 becomes "H", the RSFF circuit is set and the digital drive signal VAGC of the "H" state is outputted.

The operation of the circuit shown in FIG. 6 is the same as in the case of FIG. 3. That is, the AC signal resonated by the tuning circuit is transferred to the hysteresis comparator by the level shift circuit. When the amplitude level of the AC signal becomes excessive and exceeds the reference voltage (automatic adjustment-use reference amplitude level), the output of the hysteresis comparator is varied from "L" to "H". As a result, the digital drive signal VAGC from the RSFF circuit is varied from "L" to "H", the transistor MN0 is switched to the ON state and the AGC operation begins.

Figure 7:
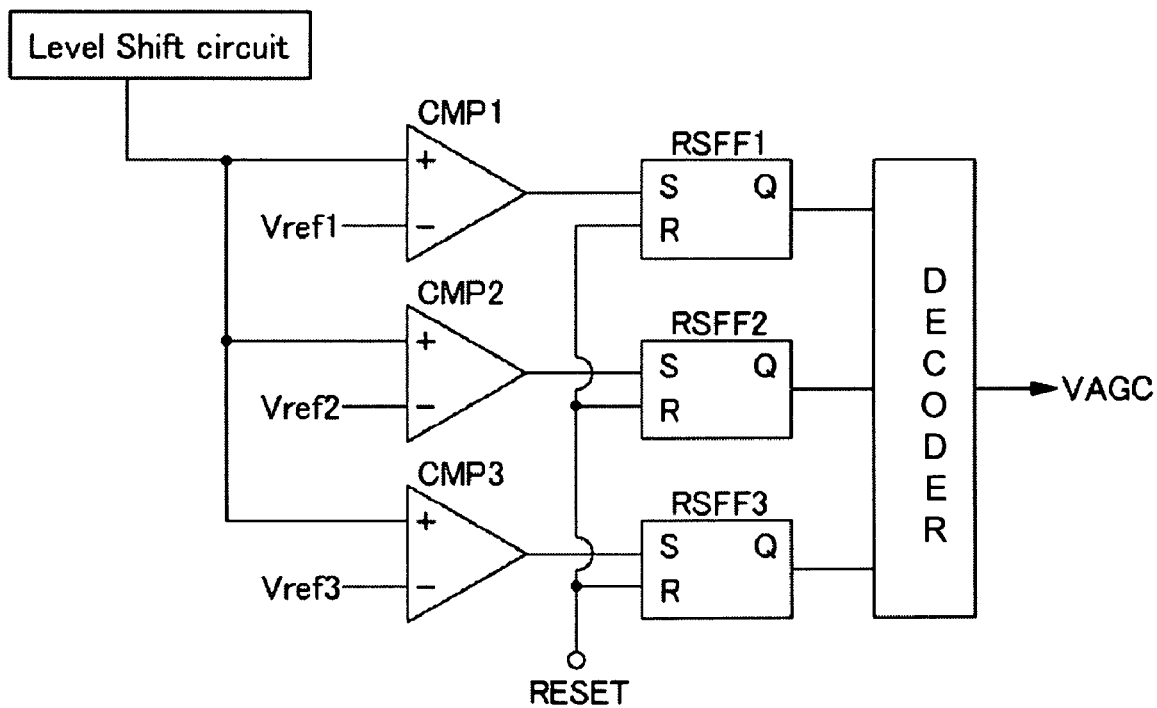
FIG. 7 is a partial circuit diagram in a case where the tuning circuit having an amplitude-varying function according to the embodiment of the invention takes an analog drive arrangement.

It should be noted that, in a case where the AGC operation is stopped and the signal states of each section are initialized, the state of the signal applied to the reset terminal RESET is varied from "H" to "L". Here, a specific example of the aforementioned discrete analog drive will be described. In FIGS. 3 and 6, plural values of, for example, 1V, 2V and 3V are set with respect to the voltages (drive signal VAGC) applied to the transistors MP0 and MN0. That is, in FIGS. 3 and 6, they are connected in parallel to plural level hysteresis comparators CMP1, CMP2 and CMP3, and RS flip-flop circuits RSFF1, RSFF2 and RSFF3 are connected in correspondence to the hysteresis comparators CMP1 to CMP3 as shown in FIG. 7, so that a plural level configuration is formed. The output terminals of the RS flip-flop circuits RSFF1 to RSFF3 are connected to a decoder. The drive signal VAGC is outputted from the decoder.

A reference voltage Vref1 for generating the drive signal VAGC is set in an inverted input terminal of the hysteresis comparator CMP1. A reference voltage Vref2 for generating a 2V drive signal VAGC is set in an inverted input terminal of the hysteresis comparator CMP2. A reference voltage Vref3 for generating a 1V drive signal VAGC is set in an inverted input terminal of the hysteresis comparator CMP3.

The output from the level shift circuit ("Level Shift Circuit" in the drawing) is applied to non-inverted input terminals of the hysteresis comparators CMP1 to CMP3, and the results in which they are compared with the reference voltages Vref1 to Vref3 are outputted. 3-bit data (4 values: HHH, HHL, HLL, LLL) of the RS flip-flop circuits RSFF1 to RSFF3 are outputted to the decoder in accordance with the outputs of the hysteresis comparators CMP1 to CMP3. The decoder generates a uniquely determined drive signal VAGC (one of 1V, 2V and 3V) in accordance with the 3-bit data and outputs the drive signal VAGC to the transistors MP0 and MN0.

Also, the reset D flip-flop circuit is applicable with respect to the RSFF circuit of FIG. 6 and the same operation can be obtained using the output thereof as the VAGC.

EXAMPLE APPLIED TO REMOTE CONTROL SYSTEM

Figure 8:
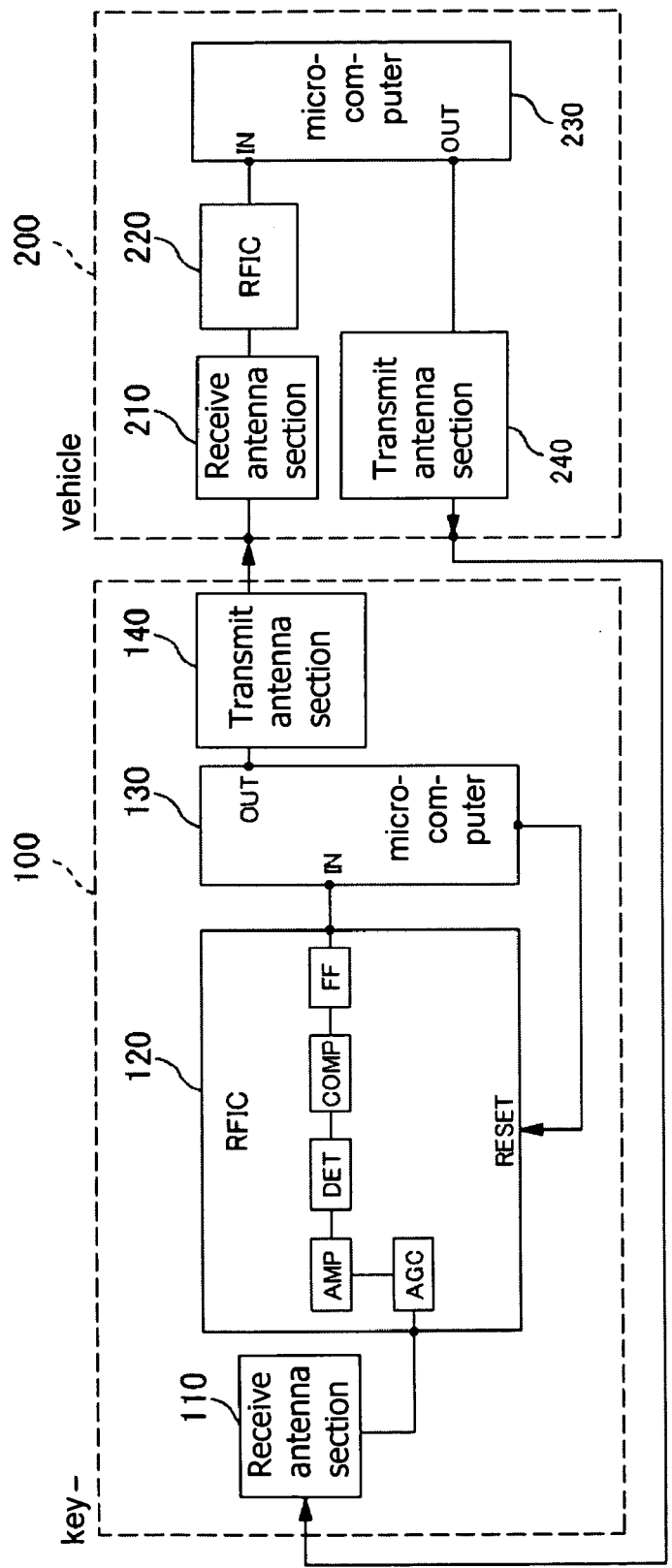
FIG. 8 is a block diagram showing an example where the tuning circuit having an amplitude-varying function according to the embodiment of the invention is applied to a wireless door lock remote control system of a vehicle.

An applied example of the tuning circuit having an amplitude-varying function described in the preceding embodiment and modified example will be described with reference to FIG. 8. In this applied example, the invention is applied to, for example, a key 100 and a wireless door lock (or an engine starting and stopping) remote control system (two-way communication keyless system) for a vehicle 200.

The key 100 is disposed with a receiving-use antenna section 110, an RF (Radio Frequency) IC (Integrated Circuit) 120 that is an integrated circuit for a wireless communication device, a microcomputer 130, and a transmitting-use antenna section 140 configured by an LC oscillator circuit. The receiving-use antenna 110 is a tuning circuit disposed with the coil L1 and the capacitor C1 in FIGS. 3 and 6 according to the invention. The RIFC 120 is disposed with the AGC circuit system in FIGS. 3 and 6 according to the invention and the AGC including the transistors MP0 and MN0. In addition, the RFIC 120 is disposed, as is well known, with an amplifier AMP that amplifies the AC signal from the AGC, a detecting circuit DET, a comparator COMP and a flip-flop FF. The microcomputer 130 processes the output signal from the flip-flop FF. The microcomputer 130 also executes ASK transmission or FSK (Frequency Shift Keying) transmission through the transmitting-use antenna section 140 from a data output terminal DATA OUT of the microcomputer 130.

The vehicle 200 is configured by a receiving-use antenna 210, an RFIC 220, a microcomputer 230 and a transmitting-use antenna section 240. Each of the constituent elements 210 to 240 is similarly configured by the receiving-use antenna section 110, the RFIC 120, the microcomputer 130 and the transmitting-use antenna section 140 of the key 100, and executes communication with the key 100.

Other

Equivalents such as alternative circuits having the same function as that of the resistance-adjusting element of the invention are also included in the technical scope of the invention.

The amplitude of the output signal of the tuning circuit is varied by varying the resistance of the tuning circuit with the resistance-adjusting element. Therefore, minute detection of the output signal is enabled by raising the sensitivity of the tuning circuit and, even if the amplitude of the output and input becomes excessive, the amplitude thereof can be suppressed. That is, the invention can accommodate a wide dynamic range.

Thus, in a case where the invention is disposed with a voltage-drivable automatic adjustment circuit system to realize the amplitude-varying function of the tuning circuit, power consumption can be significantly reduced in comparison to a case where a conventional analog control system is used. Power consumption of a battery whose capacity is limited can be reduced particularly in a case where the circuit of the invention is used in a battery-driven product.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

It is claimed:

1. A tuning circuit having an amplitude-varying function comprising:
   a coil;
   a capacitor; and
   a resistance-adjusting element connected in parallel to said coil and said capacitor for varying resistance at time of resonance of said tuning circuit, wherein
   an amplitude of an output signal of said tuning circuit is varied by varying said resistance with said resistance-adjusting element based on the amplitude of the output signal of said tuning circuit.

2. The tuning circuit having an amplitude-varying function according to claim 1, wherein
   said resistance-adjusting element comprises a transistor, said resistance-adjusting element varying a voltage applied to a control electrode of said transistor in order to vary said resistance.

3. The tuning circuit having an amplitude-varying function according to claim 1, wherein
   said resistance-adjusting element comprises a transistor, said resistance-adjusting element switching ON and OFF said transistor in order to vary said resistance.

4. The tuning circuit having an amplitude-varying function according to claim 3, further comprising an automatic adjustment circuit system that includes:
   a comparator that varies an output when said amplitude of said output signal of said tuning circuit exceeds an automatic adjustment-use reference amplitude level; and
   a transistor drive-use digital circuit that outputs, in response to said variance in said output of said comparator, a digital drive signal for varying said voltage applied to said control electrode of said transistor.

5. The tuning circuit having an amplitude-varying function according to claim 1, wherein
   a predetermined reference voltage is applied to respective ends of said coil and of said capacitor making up said tuning circuit, and wherein
   an alternating current signal resonated by said tuning circuit is outputted from other ends of said coil and of said capacitor.

6. The tuning circuit having an amplitude-varying function according to claim 1, wherein
   respective ends of said coil and of said capacitor making up said tuning circuit are grounded, and wherein an alternating current signal resonated by said tuning circuit is outputted from other ends of said coil and of said capacitor.

* * * * *